(12) United States Patent
Power

(10) Patent No.: US 11,640,688 B2
(45) Date of Patent: May 2, 2023

(54) APPARATUS AND METHOD FOR DATA GENERATION

(71) Applicant: Sony Interactive Entertainment Inc., Tokyo (JP)

(72) Inventor: Phillip David Power, Bristol (GB)

(73) Assignee: Sony Interactive Entertainment Inc., Tokyo (JP)

(*) Notice: Subject to any disclaimer, the term of this patent is extended or adjusted under 35 U.S.C. 154(b) by 505 days.

(21) Appl. No.: 16/927,010

(22) Filed: Jul. 13, 2020

(65) Prior Publication Data

US 2021/0027120 A1    Jan. 28, 2021

(30) Foreign Application Priority Data

Jul. 26, 2019 (GB) .................................. 1910723

(51) Int. Cl.
*G06T 15/00* (2011.01)

(52) U.S. Cl.
CPC .................................. *G06T 15/005* (2013.01)

(58) Field of Classification Search
None
See application file for complete search history.

(56) References Cited

U.S. PATENT DOCUMENTS

| 2011/0199377 A1 | 8/2011 | Jang | |
| 2015/0119139 A1* | 4/2015 | Ladell | G06T 1/60 463/31 |
| 2018/0001190 A1 | 1/2018 | Kerr | |
| 2019/0206371 A1* | 7/2019 | Marchya | G06T 1/20 |

FOREIGN PATENT DOCUMENTS

| GB | 2521170 A | 4/2017 |
| GB | 2548853 A | 10/2017 |

OTHER PUBLICATIONS

Combined Search and Examination Report for corresponding GB Application No. GB1910723.4, 5 pages, dated Dec. 11, 2019.
Extended European Search Report for corresponding EP Application No. 20183173.2, 9 pages, dated Nov. 27, 2020.
Li Yule, et al., "Low Latency Video Semantic Segmentation" IFFF/CVF Conference on Computer Vision and Pattern Recognition, pp. 5997-6005, Jun. 18, 2018.

* cited by examiner

*Primary Examiner* — Chan S Park
*Assistant Examiner* — Elisa M Rice
(74) *Attorney, Agent, or Firm* — Matthew B. Dernier, Esq.

(57) ABSTRACT

A data processing apparatus comprises a processing unit to generate image data for rendering data for display as an image frame, a memory to store the image data, the image data comprising data for a given object in the image frame, detection circuitry to detect, for the data for the given object, one or more properties associated with the given object in the image frame, prediction circuitry to generate, based on one or more of the properties, a confidence score for the data for the given object indicative of a likelihood that the data for the given object is to be used for more than a threshold number of image frames in a sequence of image frames, and allocation circuitry to allocate indicator data to the data for the given object, the indicator data indicative of a magnitude of the confidence score for the data for the given object, and to store the data for the given object in the memory in association with the corresponding indicator data.

20 Claims, 8 Drawing Sheets

APPARATUS AND METHOD FOR DATA GENERATION

FIELD OF THE DISCLOSURE

The present disclosure relates to an apparatus and method for generating and storing data for computer graphics.

BACKGROUND

The speed and realism with which a scene can be rendered is a key consideration in the field of computer graphics processing. Graphics processing operations are performed by a processing unit (GPU and/or CPU) as part of an execution of an application such as a computer game. Graphics processing operations typically comprise processing of model data or other predefined graphical data in accordance with a graphics processing pipeline to generate image data for rendering data for display as an image frame. Image data that is generated by performing such graphics processing operations is then temporarily held in a memory for use in displaying an image frame.

For an image frame including multiple subjects (objects), the image data for the image frame is typically generated by performing graphics processing operations using input data structures each defining the respective subjects in the image frame. For example, graphics processing operations typically comprise one or more geometric processing operations for operating on the vertices of a polygonal mesh data structure to generate image data for an object corresponding to the polygonal mesh. Image data is thus generated for each subject in the image frame.

Applications such as computer games often require rendering of images in which multiple graphical objects are represented and one or more of the graphical objects may be included in multiple image frames.

It is therefore desirable to generate and store data for displaying image frames with improved efficiency.

It is in this context that the present invention arises.

SUMMARY

An example embodiment provides a data processing apparatus comprising: a processing unit to generate image data for rendering data for display as an image frame;

a memory to store the image data, the image data comprising data for a given object in the image frame;

detection circuitry to detect, for the data for the given object, one or more properties associated with the given object in the image frame;

prediction circuitry to generate, based on one or more of the properties, a confidence score for the data for the given object indicative of a likelihood that the data for the given object is to be used for more than a threshold number of image frames in a sequence of image frames; and allocation circuitry to allocate indicator data to the data for the given object, the indicator data indicative of a magnitude of the confidence score for the data for the given object, and to store the data for the given object in the memory in association with the corresponding indicator data.

Another example embodiment provides a data processing method comprising:

generating image data for rendering data for display as an image frame;

storing, by a memory, the image data, the image data comprising data for a given object in the image frame;

detecting, for the data for the given object, one or more properties associated with the given object in the image frame;

generating, based on one or more of the properties, a confidence score for the data for the given object indicative of a likelihood that the data for the given object is to be used for more than a threshold number of image frames in a sequence of image frames;

allocating indicator data to the data for the given object, the indicator data indicative of a magnitude of the confidence score for the data for the given object; and storing the data for the given object in the memory in association with the corresponding indicator data.

Example embodiments provide computer software which, when executed by a computer, causes the computer to perform the steps of the method defined above.

Example embodiments provide a machine-readable, non-transitory storage medium which stores such computer software.

Various other aspects and features of the present disclosure are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
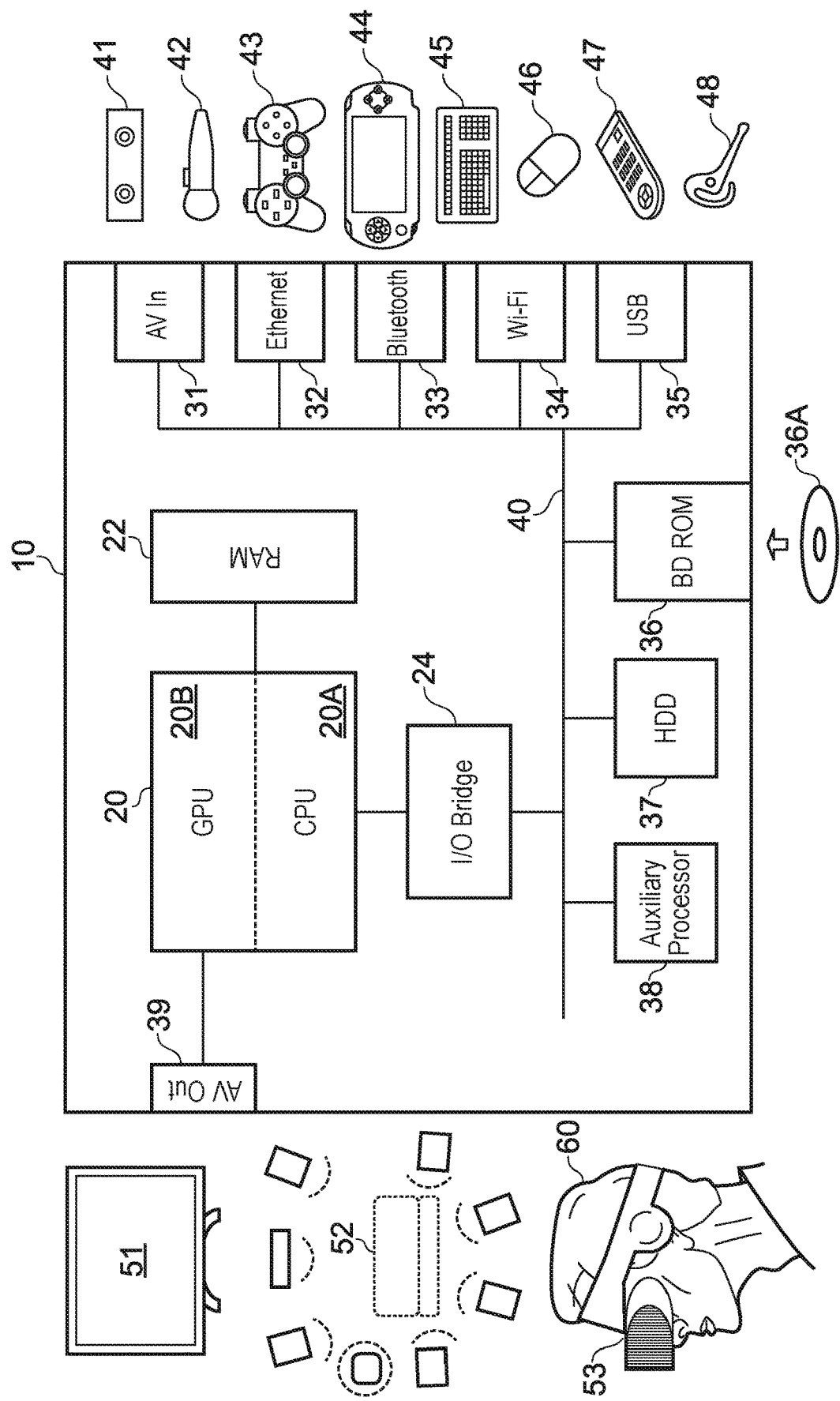
FIG. 1 is a schematic diagram illustrating a computer game processing apparatus.

A more complete appreciation of the disclosure and many of the attendant advantages thereof will be readily obtained as the same becomes better understood by reference to the following detailed description when considered in connection with the accompanying drawings, wherein:

FIG. 1 schematically illustrates the overall system architecture of a computer game processing apparatus such as the Sony® PlayStation 4® entertainment device. A system unit 10 is provided, with various peripheral devices connectable to the system unit.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images (image data) and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

FIG. 1 therefore provides an example of a computer game processing apparatus configured to execute an executable program and to generate image data for use in displaying a sequence of image frames, each image frame comprising one or more graphical objects.

Figure 2:
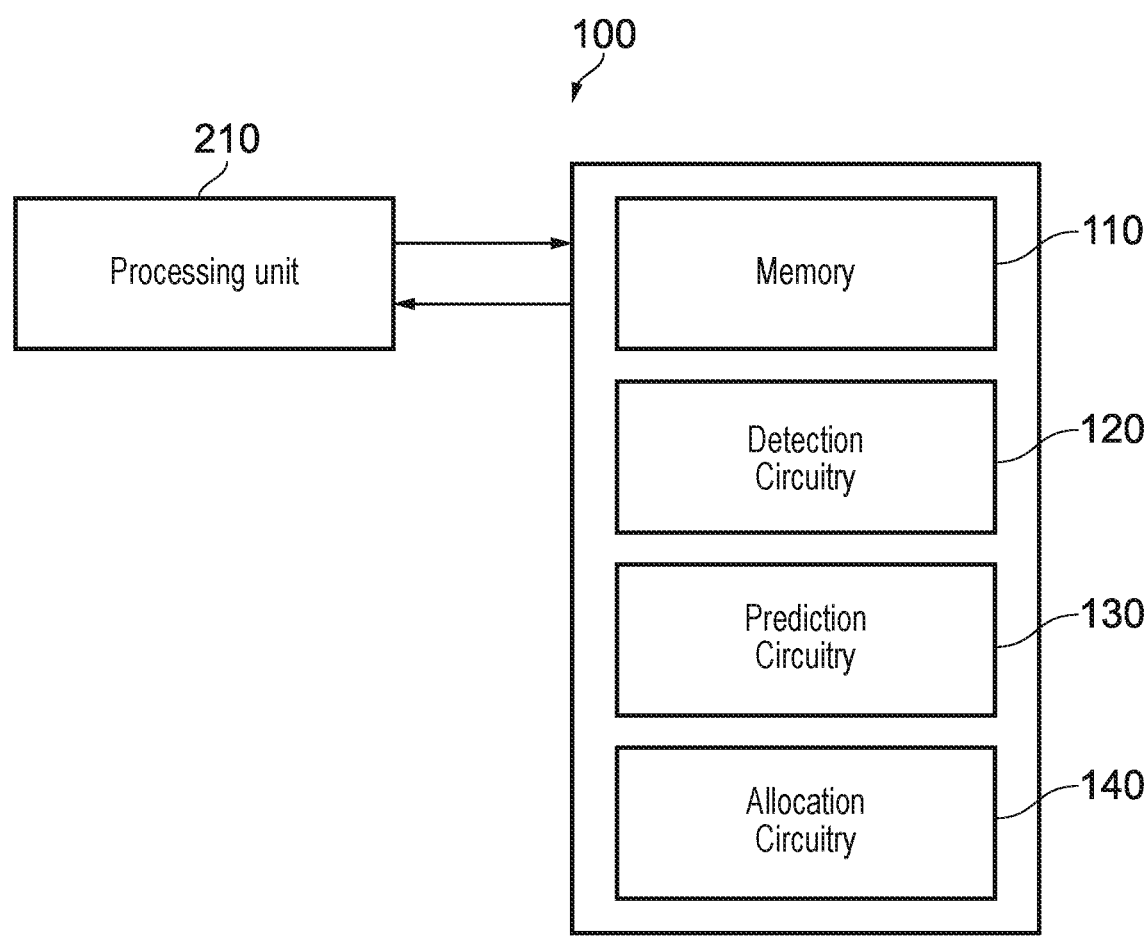
FIG. 2 is a schematic diagram illustrating a data processing apparatus.

FIG. 2 schematically illustrates a data processing apparatus 100 for generating a prediction indicative of a likelihood that data for a graphical object in an image frame is to be used for more than a threshold number of images frames in a sequence of image frames and allocating indicator data to the data for the graphical object in accordance with the prediction. In embodiments of the disclosure, the data processing apparatus 100 comprises: a processing unit 210 to generate image data for rendering data for display as an image frame; a memory 110 to store the image data generated by the processing unit 210, the image data comprising data for a given object in the image frame; detection circuitry 120 to detect, for the data for the given object, one or more properties associated with the given object in the image frame; prediction circuitry 130 to generate, based on one or more of the properties, a confidence score for the data for the given object indicative of a likelihood that the data for the given object is to be used for more than a threshold number of image frames in a sequence of image frames; and allocation circuitry 140 to allocate indicator data to the data for the given object, the indicator data indicative of a magnitude of the confidence score for the data for the given object, and to store the data for the given object in the memory 110 in association with the corresponding indicator data.

The prediction circuitry 130 is configured to generate the confidence score for the data for the given object in the image frame, in which the confidence score is indicative of the likelihood that the data for the given object is to be used in more than the threshold number of image frames. For example, the processing unit 210 may generate first data for a first object in the image frame and second data for a second object in the image frame. In this case, the allocation circuitry 140 is configured to store the first data in the memory 110 in association with indicator data indicative of the magnitude of the confidence score generated for the first data, and the second data can be stored in the memory 110 in association with indicator data indicative of the magnitude of the confidence score generated for the second data. Hence, the indicator data provides an indication of a level of confidence that the data will be used in more than the threshold number of image frames and the data can be held in the memory 110 in association with the indicator data. For the case where the threshold number of image frames is set to one image frame, the indicator data provides an indication of a re-use likelihood for the data for the given object.

In this context, the data processing apparatus 100 may be provided as part of a computer game processing apparatus, such as that illustrated in FIG. 1, or a general purpose computing device. The processing unit 210 of the data processing apparatus 100 is configured to generate image data for rendering data for display as an image frame, wherein the processing unit 210 comprises at least one of the CPU 20A and the GPU 20B. The memory 110 is configured to store the image data generated by the processing unit 210 in order to allow the image data to be held prior to being read-out for rendering data for display. Prior to the data being read-out, the data for a given object held by the memory region 110 is analysed by the detection circuitry 120, a confidence score is generated, and indicator data is allocated to the data in the memory 110. Therefore, indicator data is allocated to the data for the given object stored in the memory prior to the data being read-out, wherein the indicator data is indicative of a likelihood that the data will be used in more than the threshold number of image frames. In this way, after the data for the given object has been accessed and used for displaying a current image frame, the memory 110 can continue to store the data for the given object in association with the indicator data, and the data for the given object is retained in the memory 110 based on the indicator data. For example, the memory 110 may store multiple instances of data each having associated indicator data, and an instance of data for which the indicator data indicates a lowest confidence is overwritten instead of an instance of data for which the indicator data indicates a highest confidence. In some examples the memory 110 shown in FIG. 2a may be provided as a portion of the RAM 22 shown in FIG. 1.

More generally, the memory 110 is a region of physical memory storage used to store image data that has been generated by performing various graphics processing operations. A graphics processing pipeline defines processing steps whereby model data comprising vertex data for a graphical object undergoes a number of processing steps to generate image data for rendering data for display. Therefore, image data can be generated by the processing unit 210 in accordance with a graphics processing pipeline and the resulting image data is output to the memory 110. The memory 110 is thus configured to store image data generated by the processing unit 210, and the image data is analysed by the detection circuitry 120 to detect one or more properties associated with a given object in an image frame on the basis of the data stored for the given object.

For an image frame including a plurality of objects, the image data comprises first data for a first object in the image frame and second data for a second object in the image frame. The first data may define one or more properties for the first object, including one or more geometric properties of the first object and one or more visual properties of the first object (e.g. shading or lighting). The detection circuitry 120 is configured to detect, based on the data for a given object, one or more properties associated with the given object in the image frame.

For example, the graphics processing operations performed by the processing unit 210 may comprise one or more geometric processing operations and one or more shader processing operations for operating on the vertices of a polygonal mesh to generate image data for an object on the basis of the input polygonal mesh data. A step of vertex specification may be performed to setup a list of vertices associated with an object for inputting to a graphics processing pipeline. Vertex shader and geometry shader processing operations may then be performed for the vertices followed by steps of primitive assembly and rasterization in order to generate output data for the given object. The image data generated for an image frame thus comprises data for the respective objects included the image frame, including data indicative of the geometric characteristics and visual characteristics of the object in the image frame.

The object data generated for a given object may define properties for the object in the image frame comprising one or more from the list consisting of: a position of the object in the image frame; an orientation of the object in the image frame; a lighting of the object in the image frame; a depth of the object in the image frame; a position of a virtual camera defining a viewpoint for the image frame; an orientation of the virtual camera defining the viewpoint for the image frame; and a field of view of the virtual camera. The detection circuitry 120 is configured to analyse the image data stored by the memory 110 and to detect one or more properties associated with the object data for a given object. As such, the detection circuitry 120 can detect any of the geometric or visual properties associated with the given object on the basis of the data stored by the buffer memory 110 for the given object.

The result of the detection performed by the detection circuitry 120 provides an indication of one or more properties for the given object in the image frame, and the prediction circuitry 130 is configured to generate a confidence score for the data on the basis of the detection result. Specifically, on the basis of the properties detected by the detection circuitry 120 for the object data for the given object (e.g. at least one of object position, object orientation, object depth, object lighting (shading), virtual camera position and virtual camera orientation), the prediction circuitry 130 can generate a confidence score indicating a likelihood that the data for the given object will be used in more than a threshold number of image frames. In other words, the prediction circuitry 130 can generate a prediction indicating a likelihood that the data for the given object will be generated by the processing unit 210 more than a threshold number of times when rendering a sequence of images for an application. In some examples, the threshold number of image frames is set to one image frame, however, a user may select any value for the threshold number of image frames based on a user input specifying a value for the threshold number of image frames. In some examples, the threshold number of image frames may be set to N, where N is an integer value specified by the user.

When generating image data for an executing application, image data is typically generated for each individual image frame and a plurality of image frames are displayed in a sequence. Therefore, when the same object having the same properties is present in multiple image frames, the data for the object is traditionally generated for each image frame and is thus generated multiple times. In embodiments of the disclosure, the processing efficiency associated with generating and storing data for graphical objects is improved by generating a confidence score and storing data for a graphical object in the memory 110 in association with its corresponding indicator data so that the data can be held in the memory 110 and used for multiple image frames in a sequence of image frames. The prediction circuitry 130 generates the confidence score for object data for a given object in a current image frame based on one or more of the properties of the given object in the current image frame, and the indicator data is allocated to the object data by the allocation circuitry 140 to allow the object data to be stored in the memory 110 in association with the indicator data. In this way, the object data can be stored in the memory 110 even after that object data is read-out for the current image frame and the object data 110 can be accessed from the memory 110 for one or more later image frames in the sequence of images frames. Therefore, the object data can be initially generated by the processing unit 210 for one image frame and then obtained from the memory 110 when required for one or more later image frames rather than the processing unit 210 having to generate the object data again for each later image frame.

In some examples, the prediction circuitry 130 may comprise a statistical model for generating the confidence score for the object data for the given object in the image frame. The prediction circuitry 130 may store data for a statistical model associating an object property, such as object position in the image frame, with a likelihood that the geometric property for the object will be used in more than the threshold number of image frames. For example, the statistical model may assign a high likelihood to an object having a position at the centre of an image frame and a low likelihood to an object having a position at a peripheral area of an image frame. In this way, an object located near the centre of the image frame, which is likely to be of greater importance in the content than an object located near the edge of the image frame, can be assigned a high likelihood of occurrence in more than the threshold number of image frames. Conversely, an object located near the periphery of the image frame, which is likely to be of lesser importance in the content than an object located near the centre of the image frame, can be assigned a low likelihood of occurrence in more than the threshold number of image frames.

The statistical model may similarly define a likelihood for other properties associated with the object. In some cases, the statistical model may assign a likelihood to an object in an image frame on the basis of the orientation of the object with respect to the viewpoint for the image frame. For example, the statistical model may assign a high likelihood to an object (e.g. a car object) having its length aligned with the view direction (so that the front or rear of the car faces towards the viewpoint), whereas the statistical model may assign a low likelihood to the object when the object's length is perpendicular with the view direction. In this way, a high likelihood is assigned to a car object having its length approximately aligned with the view direction for the image frame, which corresponds to a view from behind the car with the direction of travel shown in the image frame in front of the car. Conversely, a low likelihood is assigned for a car object having its length approximately perpendicular with the view direction for the image frame which corresponds to a view from the side of the car.

The statistical model may assign a likelihood of occurrence to a given object in an image frame on the basis of any of the one or more properties detected by the detection circuitry 120. In some examples, the statistical model is operable to assign a first likelihood on the basis of a first property (e.g. position) of the object in the image frame and to assign a second likelihood on the basis of a second property (e.g. orientation) of the object in the image frame, and an average of the likelihood associated with each property for the object in the image frame is used to calculate an overall likelihood for the object. The prediction circuitry 130 thus generates a confidence score for the data for the given object indicative of the likelihood of occurrence in more than the threshold number of image frames which is calculated for the object using the statistical model.

In embodiments of the disclosure, the prediction circuitry 130 comprises a machine learning model trained to generate the confidence score. This will be discussed in more detail later.

As discussed above, in embodiments of the disclosure the threshold number of image frames is set to one image frame in order to generate a confidence score indicating a likelihood that data for the given object is to be used for more than one image frame.

In embodiments of the disclosure, the threshold number of image frames is one image frame in a predetermined number of consecutive image frames in the sequence of image frames, in which the predetermined number of consecutive image frames is an integer number that is greater than or equal to two. For example, an integer value N may be set as the predetermined number of consecutive image frames, in which case the threshold number of image frames is one image frame in a set of N consecutive image frames in the sequence of image frames, where N is an integer that is greater than or equal to two. In this case, the confidence score is indicative of the likelihood that the data for a given object is to be used in more than one image frame within a predetermined number of consecutive image frames. Therefore, for the case where N is set to two, the confidence score can be generated to indicate the likelihood that the object data for the given object will be used in two consecutive image frames. For the case where N is set to ten, for example, the confidence score is generated to indicate the likelihood that the object data for the given object will be used for two or more image frames within a group of ten consecutive image frames, where the two or more image frames may be consecutive or non-consecutive with each other in the sequence of image frames.

The confidence score can thus be generated to indicate the likelihood that object data used in a current image frame will be used again within a predetermined number of consecutive image frames following the current image frame in which the object data is firstly used. For the example where N is set to ten, the confidence score is indicative of the likelihood that the object data used in the current image frame will be used again in the next nine consecutive image frames following the current image frame in the sequence of image frames. Hence, the current image frame may represent the first image frame in the predetermined number of consecutive image frames and the prediction circuitry 130 is configured to generate the confidence score to indicate the likelihood that object data used in the current image frame will be used again in the N−1 image frames following the current image frame in the sequence of image frames. In other words, the N consecutive image frames has a first image frame corresponding to the current image frame in which the object data is first used and at least one image frame consecutive with, and following, the first image frame in the sequence of image frames.

It has been explained that the predetermined number of consecutive image frames includes the current image frame and the following N−1 image frames in the sequence, such that the prediction circuitry 130 generates the confidence score to indicate a likelihood that the data for an object in the current image frame will be used more than once in the predetermined number of consecutive image frames. However, it will be appreciated that the predetermined number of consecutive image frames may include just the N consecutive image frames that follow the current image frame without including the current image frame, and in this case the prediction circuitry 130 is configured to generate the confidence score to indicate a likelihood that the data for an object in the current image frame will be used at least once in the predetermined number of consecutive image frames following the current image frame. Therefore, the predetermined number of consecutive image frames may include the current image frame or may not include the current image frame and threshold condition can be appropriately selected to achieve the same result. In some examples, a user input is provided to allow a user to select any value for N ranging from two to a value corresponding to the total number of image frames in the sequence of image frames (e.g. N=2, 3, 4 . . . total number of image frames in sequence).

In embodiments of the disclosure the indicator data comprises a rating from a plurality of candidate ratings, and the allocation circuitry 140 is configured to allocate one of the plurality of candidate ratings to the data for the given object in dependence upon a magnitude of the confidence score generated for the data for the given object. The indicator data may include a first candidate rating and a second candidate rating, where the first candidate rating is allocated to the data for which the confidence score is indicative of a high probability of use in more than the threshold number of image frames, and the second candidate rating is allocated to the data for which the confidence score is indicative of a low probability of use in more than the threshold number of image frames. One of the plurality of candidate ratings can thus be allocated to the data for the given object to categorise the data according to a likelihood of use in more than the threshold number of image frames. In some examples, the confidence score generated by the prediction circuitry 130 is a normalised value ranging from 0 to 1 indicating a probability that the data for the given object will be generated by the processing unit 210 more than the threshold number of times for the sequence of image frames. A predetermined threshold may be used for comparison with the confidence values generated by the prediction circuitry 130, so that the first candidate rating is allocated to the data for the given object when the data for a given object has a confidence value that is greater than the predetermined threshold and the second candidate rating is allocated to the data for the given object when the data for a given object has a confidence value that is less than the predetermined threshold. For example, for the plurality of ratings, a first rating may correspond to a classification of "highest likelihood of use" and an Nth rating (N is equal to two or more) may correspond to a classification of "lowest likelihood of use".

Figure 3:
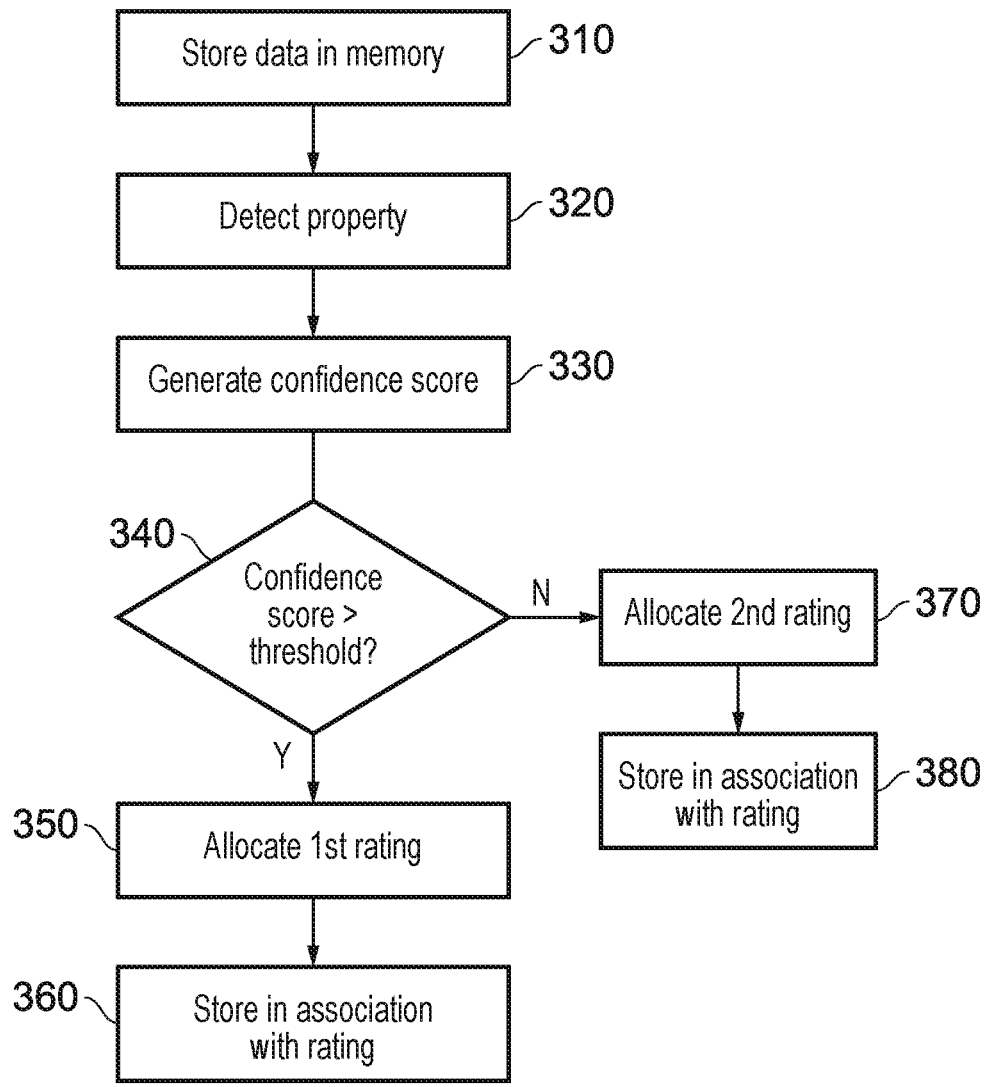
FIG. 3 is a schematic flowchart illustrating a method of allocating indicator data to object data stored in memory.

FIG. 3 is a schematic flow chart illustrating allocating one of the plurality of candidate ratings to the data for the given object. At a step 310, image data for an image frame is stored in the memory 110. At a step 320, the detection circuitry 120 detects one or more properties for a given object in the image frame based on the data for the given object. At a step 330, the prediction circuitry 130 generates the confidence score for the data for the given object. At a step 340, the allocation circuitry 140 is configured to compare a magnitude of the confidence score with a predetermined threshold. When the confidence score has a value that is greater than the predetermined threshold, the flow proceeds to a step 350. At the step 350, the allocation circuitry 140 allocates a first candidate rating to the data for the given object, and then at a step 360 the allocation circuitry 140 stores the data for the given object in the memory 110 in association with the indicator data having the first candidate rating. At the step 340, when the confidence score has a value that is less than the predetermined threshold, the flow proceeds to a step 370. At the step 370, the allocation circuitry 140 allocates a second candidate rating to the data for the given object, and then at a step 380 the allocation circuitry 140 stores the data for the given object in the memory 110 in association with the indicator data having the second candidate rating.

The processes illustrated in FIG. 3 can be implemented using a plurality of thresholds to allocate one of the plurality of candidate ratings to the data for the given object in dependence upon a magnitude of the confidence value generated for the data for the given object. For example, a first candidate rating is allocated when the confidence score is greater than a first threshold, a second candidate rating is allocated when the confidence score is less than the first threshold and greater than a second threshold, and a third candidate rating is allocated when the confidence score is less than the second threshold.

The indicator data may comprise any number of candidate ratings to achieve a granular rating system (categorisation system) for rating respective instances of object data stored in the memory 110. Therefore, each instance of object data stored in the memory 110 is stored in association with its corresponding indicator data, and data having a high confidence rating is distinguished from data having a low confidence rating according to the indicator data.

In embodiments of the disclosure the indicator data comprises a sub-rating from a plurality of candidate sub-ratings, and the allocation circuitry is configured to allocate one of the plurality of candidate sub-ratings to the data for the given object in dependence upon a processing time associated with generating for the data for the given object. When generating image data for an image frame, generating the data for each of the one or more objects in the image frame has an associated processing overhead (processing load) such that a certain amount of processing time is required to generate the data. For example, the processing of the vertex data for an object requires various graphics processing operations requiring a certain computation time to generate the data. As well as allocating one of the plurality of candidate ratings, the allocation circuitry 140 can also allocate one of the plurality of candidate sub-ratings to the data for the given object. For example, each candidate sub-rating may correspond to a certain range of predetermined processing times (e.g. a first candidate sub-rating may correspond to a time range A seconds to B seconds, and a second candidate sub-rating may correspond to a time range C seconds to D seconds), and one of the candidate sub-ratings can be allocated to the data for the given object depending on a predetermined processing time required to generate the data. One of the plurality of sub-ratings can thus be allocated to the data for the given object to further categorise the data according to processing time. For example, for a plurality of candidate sub-ratings, a first candidate sub-rating may correspond to a classification of "longest processing time" and an Nth candidate sub-rating (N is equal to two or more) may correspond to a classification of "shortest processing time".

For example, an amount of processing time required for generating an instance of object data may be calculated by the data processing apparatus 100 according to a number of vertices to be processed to generate the object data (a larger number of vertices corresponds to a larger processing time). In this way, both a candidate rating and a candidate sub-rating can be assigned for the data, and the data can then be stored in memory 110 in association with the indicator data, where the indicator data comprises both the allocated candidate rating and the allocated candidate sub-rating.

In embodiments of the disclosure the memory 110 has a data eviction policy that is dependent upon the indicator data. As discussed above, the allocation circuitry 140 is configured to store the data for a given object in the memory 110 in association with its corresponding indicator data. The indicator data is allocated to each instance of object data that is stored in the memory 110 according to the magnitude of the confidence score generated for the instance of object data. For the case where the memory 110 stores data for a plurality of image frames including a plurality of objects, the indicator data is allocated to each of the plurality of instances of object data stored in the memory 110. In addition, where the memory 110 stores data for a plurality of image frames including the same object having a plurality of different appearances (e.g. different geometric configurations) in the respective image frames, the indicator data is allocated to each of the plurality of instances of object data stored in the memory 110 for the object. When the memory 110 is fully occupied and new data is to be stored by the memory 110, the instances of object data that have high confidence scores (indicated by the indicator data) are preferentially stored in the memory 110, whilst an instance of object data having a lowest confidence score (indicated by the indicator data) is evicted from the memory 110. A plurality of instances of object data are stored in the memory 110 in association with their corresponding indicator data, and the indicator for each instance of object data is used to order (rank) the respective instances of object data to establish an ordering for evicting the instances of object data from the memory 110.

For the case where first object data for a first object is stored in the memory 110 in association with indicator data indicative of a high confidence score and second object data for a second object is stored in the memory 110 in association with indicator data indicative of a low confidence score, the indicator data associated with each of the first and second object data can be used to order the first object data with respect to the second object data in order to preferentially evict the second object data from the memory 110 instead of the first object data when the memory 110 is fully occupied and other data is to be stored in the memory 110.

As discussed previously, the indicator data comprises a plurality of candidate ratings and one of the candidate ratings is allocated to an instance of data for a given object. In this case, the candidate ratings allow the respective instances of object data stored in the memory 110 to be categorised according to the magnitude of the confidence score generated for each instance of data. For the case where the indicator data comprises a plurality of candidate ratings comprising a first candidate rating and an Nth candidate rating, where the first candidate rating corresponds to a highest confidence rating and the Nth candidate rating corresponds to a lowest confidence rating, the object data for which the indicator data has the Nth candidate rating is preferentially evicted from the memory 110 while object data for which the indicator data has the first candidate rating is preferentially stored. In the case where the memory 110 stores a plurality of instances of object data having the Nth candidate rating and new data is to be stored by the fully occupied memory 110, one of the instances of object data for which the indicator data has the Nth candidate rating is randomly selected for eviction from the memory 110. In this way, one of the instances of data having the lowest confidence rating is evicted from the memory 110.

As discussed previously, the indicator data may comprise a plurality of candidate ratings and also a plurality of candidate sub-ratings. The candidate rating provides an indication of a likelihood that the object data will be used for more than the threshold number of image frames and the candidate sub-rating provides an indication of a processing time (or processing load) associated with the object data. For the case where the first candidate sub-rating corresponds to a longest processing time and the Nth candidate sub-rating corresponds to a shortest processing time, instead of randomly selecting one of the instances of data having the lowest confidence rating for eviction from the memory 110, an instance of object data for which the indicator data has the Nth candidate rating (lowest confidence rating) and the Nth candidate sub-rating (shortest processing time) is selected for eviction from the memory 110. In the case where the memory 110 stores a plurality of instances of object data having the Nth candidate rating and the Nth candidate sub-rating, one of the instances of object data for which the indicator data has both the Nth candidate rating and Nth candidate sub-rating is randomly selected for eviction from the memory 110. In this way, one of the instances of data having the lowest confidence rating and shortest categorised processing time is evicted from the memory 110.

Therefore, data that takes the longest time to generate (or most costly to generate) and having the highest probability for re-use can be preferentially stored instead of data that takes the shortest time to generate and having the lowest probability for re-use. As such, when the memory 110 is fully occupied, the data that has a high re-use probability and a high processing cost can be preferentially retained, whilst data having a low re-use probability and a low processing cost is preferentially evicted from the memory 110. In some examples, a value is assigned to each of the plurality of candidate ratings and each of the plurality of candidate sub-ratings so that a mathematical expression can be used to calculate a value for each instance of object data in order to rank the respective instances of object data. In a simplest case, values A, B and C may be assigned to a first candidate rating, a second candidate rating and a third candidate rating, respectively, and a values X, Y and Z may be assigned to a first candidate sub-rating, a second candidate sub-rating and a third candidate sub-rating, respectively. A sum of the two values (e.g. A+X) for an instance of object data can be compared with a sum of the two values (e.g. B+Z) for another instance of object data in order to rank the instances of object data so that an instance having the highest (or lowest) summed value is preferentially evicted. Hence, instances of object data can be ranked with respect to each other according to a predetermined calculation to establish an ordering for evicting the instances of object data from the memory 110.

Figure 4:
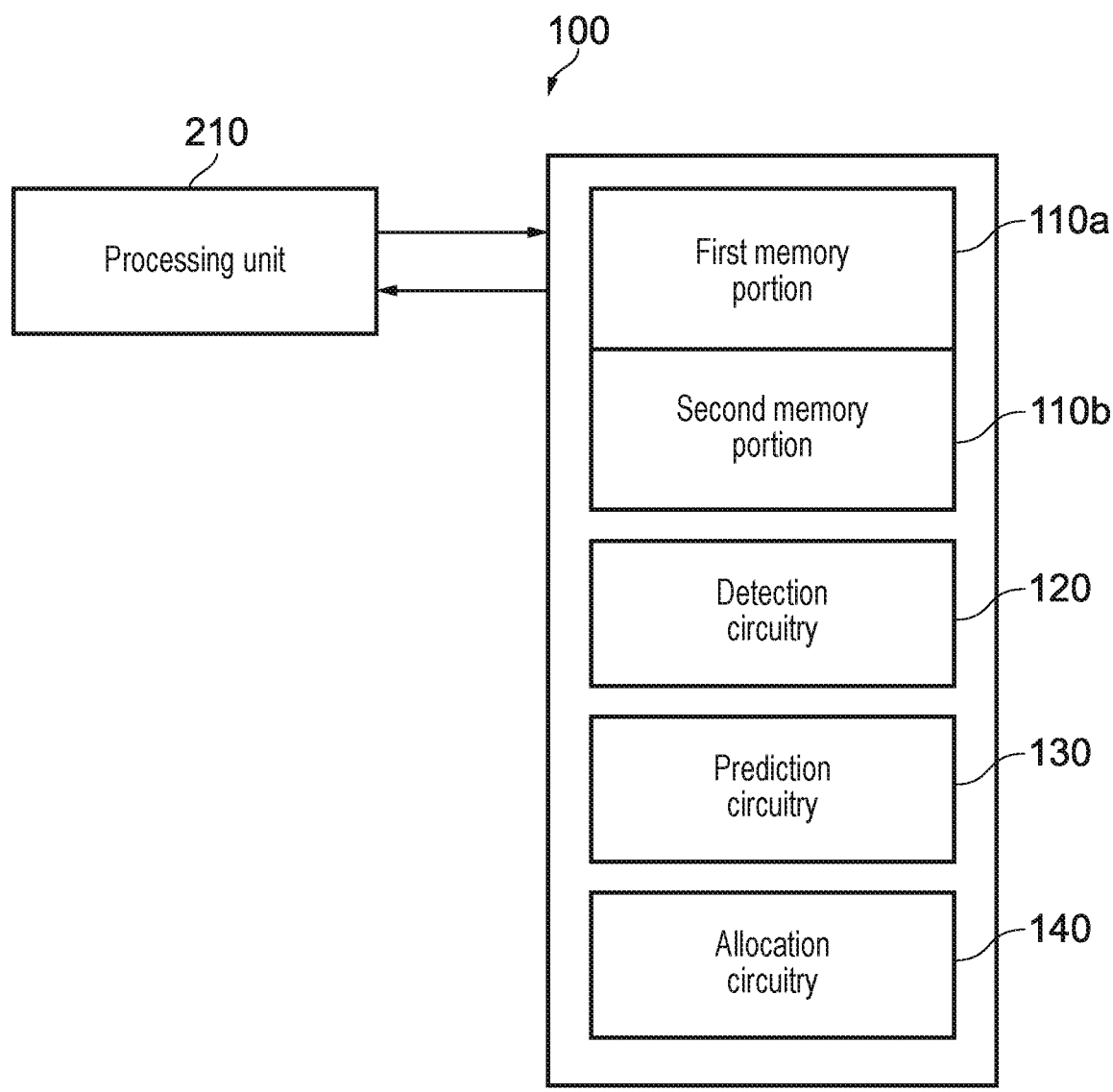
FIG. 4 is a schematic diagram illustrating a data processing apparatus comprising a first memory portion and a second memory portion.

Referring now to FIG. 4, in embodiments of the disclosure the memory 110 comprises a first memory portion 110a and a second memory portion 110b, the first memory portion 110a is configured to store the image data generated by the processing unit 210, and the allocation circuitry 140 is configured to store the data for the given object in the second memory portion 110b in association with the corresponding indicator data. Image data that is generated by the processing unit 210 is stored by the data processing apparatus 100 in the first memory portion 110a of the memory 110. Object data for a given object is stored in the first memory portion 110a and the object data is analysed by the detection circuitry 120 to detect one or more properties for the object in the image frame. The confidence score is generated for the object data by the prediction circuitry 130. The allocation circuitry 140 then allocates indicator data to the object data and stores the object data in the second memory portion 110b in association with the indicator data. In this way, the first memory portion 110a is configured to temporarily store image data that is to be read-out for displaying an image frame, and the object data stored in the first memory portion 110a is also stored by the allocation circuitry 140 in the second memory portion 110b so that an instance of the object data can be stored for use in a later image frame. Therefore, the memory locations in the first memory portion 110a are overwritten after the data has been read-out for displaying an image frame. In this case, the memory 110 may be a buffer memory having two memory portions, in which the second memory portion 110b stores object data in association with the corresponding indicator data and the second memory portion 110b therefore serves to store instances of object data which can be accessed when required for later image frames in the sequence of image frames so that the processing unit 210 does not have to repeat the processing to generate the same object data. For example, object data stored in the second memory portion 110b can be copied to the first memory portion 110a when the object data is required for another image frame in the sequence of image frames.

In embodiments of the disclosure, the first memory portion 110a and the second memory portion 110b each comprise a respective memory region and the second memory portion 110b has the data eviction policy that is dependent upon the indicator data. The memory region of the first memory portion 110a is configured to temporarily store image data for rendering data for display as an image frame. The memory region of the second memory portion 110b is configured to store object data in association with its corresponding indicator data. The respective instances of object data held in the second memory portion 110b are subject to a data eviction policy so that first object data having a lower confidence rating is preferentially evicted instead of second object data having a higher confidence rating.

Figure 5:
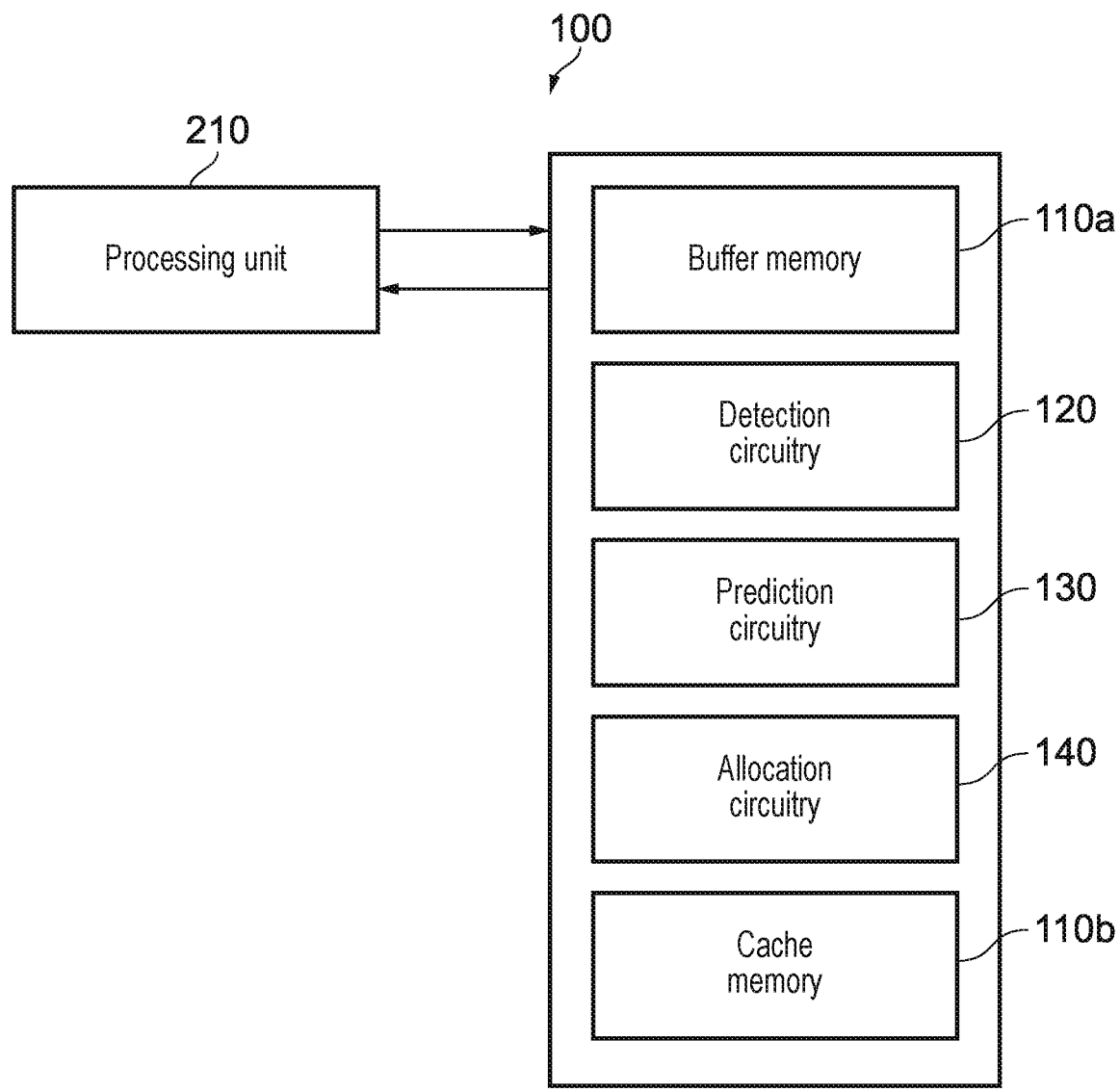
FIG. 5 is a schematic diagram illustrating a data processing apparatus comprising a buffer memory and a cache memory.

Referring now to FIG. 5, in embodiments of the disclosure, the first memory portion is a buffer memory 110a and the second memory portion is a cache memory 110b, the cache memory having a larger memory size than the buffer memory and the cache memory having the data eviction policy that is dependent upon the indicator data. The cache memory 110b therefore stores object data for a given object in association with the indicator data, such that the indicator data allocated to the data can be used for deciding the data that is preferentially retained in the cache memory 110b according to the cache eviction policy. In addition, for the case where the indicator data also comprises the sub-rating, both the rating and the sub-rating can be used for the cache eviction policy, as discussed previously.

As discussed previously, the buffer memory 110a is configured to temporarily store image data. On the basis of the prediction generated by the prediction circuitry 130, the allocation circuitry 140 allocates object data from the buffer memory 110a to the cache memory 110b so that the cache memory 110b holds instances of object data for re-use in later image frames. Data can therefore be accessed from the cache memory 110b and read into the buffer memory 110a when requested by an application. The buffer memory 110a may be provided as a portion of the RAM 22 shown in FIG. 1. The cache memory 110b may also be provided as part of the computer game processing apparatus illustrated in FIG. 1 (not shown in FIG. 1) so that data can be stored in the cache memory 110b and accessed by the buffer memory 110a and/or the processing unit 210.

Referring now to FIGS. 2, 4 and 5, in embodiments of the disclosure, the processing unit 210 is configured to generate the image data for the image frame in dependence upon a signal indicative of whether at least a portion of the image data to be generated is stored in the memory 110 in association with the indicator data. The processing unit 210 is configured to generate image data, as indicated by the arrow from the processing unit 210 in FIGS. 2, 4 and 5, and the image data is stored in the memory 110 in association with corresponding indicator data. When the processing unit 210 is required to generate data for a given object that has previously been generated for another image frame, rather than having to re-generate the data for a current image frame by performing various graphics processing operations, the processing unit 210 can access the data from the memory 110. The processing unit 210 is configured to generate a data access request that is communicated to the allocation circuitry 140 and, in response to the data access request from the processing unit 210, the allocation circuitry 140 is configured to generate a signal (as indicated by the arrow towards the processing unit 210 in FIGS. 2, 4 and 5) indicative of whether at least a portion of the image data to be generated by the processing unit 210 is stored in the memory 110 in association with the indicator data. Therefore, when data to be generated by the processing unit 210 is already stored in the memory 110, the data can be accessed from the memory 110 by the processing unit 210 so that for a current image frame the processing unit 210 generates a portion of the image data for the current image frame.

For example, the processing unit 210 may execute a shader program for generating image data and the processing unit 210 is configured, in response to the signal indicating that data in the memory 110 is the same as the data that is to be output by the shader program, to access the data from the memory 110. Consequently, one or more portions of a graphics processing pipeline executed by the processing unit 210 can be selectively enabled and disabled according to whether the data that is to be generated by the processing unit 210 is available in the memory 110. Therefore, the graphics processing operations performed by the processing unit 210 vary in dependence upon the properties of the signal communicated to the processing unit 210 from the allocation circuitry 140.

In embodiments of the disclosure, the processing unit 210 is configured to generate a portion of the image data for the image frame in response to a signal indicating that data for one or more objects to be generated by the processing unit 210 is stored in the memory 110 in association with the indicator data, and to obtain another portion of the image data for the image frame from the memory. The processing unit 210 is requested by an executing application to generate image data for an image frame including a plurality of objects. The processing unit 210 is configured to transmit a data access request to the allocation circuitry 140 to request the object data for each of the plurality of objects. The data access request thus allows the processing unit 210 to query whether the data to be generated is stored in the memory 110. In response to the data access request, the allocation circuitry 140 generates a signal indicating whether the object data for any of the plurality of objects is stored in the memory 110. When the signal indicates that object data for one or more of the objects is stored in the memory 110, the allocation circuitry 140 is configured to transmit the requested object data to the processing unit 210 so that the object data for one or more of the objects does not have to be generated by the processing unit 210. Therefore, the allocation circuitry 140 is configured to initiate a read operation for the data stored in the memory 110 in response to generating the signal indicating that at least a portion of the image data to be generated by the processing unit 210 is stored in the memory 110 in association with the indicator data, in which the data accessed by the read operation is sent to the processing unit 210.

In embodiments of the disclosure, the memory 100 comprises the first memory portion 110a and a second memory portion 110b, the first memory portion 110a is configured to store the image data generated by the processing unit 210, the allocation circuitry 140 is configured to store the data for the given object in the second memory portion 110b in association with the corresponding indicator data, and the processing unit 210 is configured to initiate transfer of data for one or more objects from the second memory portion 110b to the first memory portion 110a in response to a signal indicating that data for one or more objects to be generated by the processing unit 210 is stored in the second memory portion 110b in association with the indicator data. In this way, one or more instances of object data stored in association with the indicator data in the second memory portion 110b can be copied to the first memory portion 110a in response to the data access request from the processing unit 210. Therefore, data stored in the second memory portion 110b is used to populate the first memory portion 110a so that at least some of the data in the first memory portion 110a is obtained from the second memory portion 110b. Consequently, at least a portion of the image data stored in the first memory portion 110a, which is used for displaying an image frame in a sequence of image frames, can be obtained from the second memory portion 110b. For example, the allocation circuitry 140 can be configured to initiate a transfer operation for the data stored in the second memory portion 110b in response to generating the signal indicating that at least a portion of the image data to be generated by the processing unit 210 is stored in the second memory portion 110b in association with the indicator data, in which the data subjected to the transfer operation is copied from the second memory portion 110b to the first memory portion 110a.

In embodiments of the disclosure, the processing unit 210 is configured to generate the image data for the image frame within a predetermined period of time and to generate the data for each object in the image frame according to a priority order that is dependent upon the indicator data associated with the data for the one or more objects stored in the memory. In embodiments of the disclosure, the processing unit is configured to firstly generate data for a first object having indicator data indicative of a first confidence score and then generate data for a second object having indicator data indicative of a second confidence score, in which the first confidence score has a lower confidence rating than the second confidence score. In embodiments of the disclosure, upon expiry of the predetermined period of time for generating the image data for the image frame, the processing unit 210 is configured to obtain the image data that is not generated by the processing unit 210 within the predetermined period of time from the memory 110.

Each image frame in the sequence of image frames has an associated period of time (allotted period of time) in which to generate the data for the image frame. By generating the data for the given image frame in accordance with the priority order, the period of time available for generating the data for a given image frame can be used to firstly generate the data for the given image frame that has the lowest confidence rating and to lastly generate the data for the given image frame that has the highest confidence rating. Therefore, in the case where the period of time available for generating the data for the image frame expires before the data for each object in the image frame has been generated by the processing unit 210, the data that has not been generated within the available period of time is obtained from the memory 110, and the priority order is such that the data obtained from the memory 110 has a higher confidence rating than the data that is generated by the processing unit 210. In this way, data that has a lower likelihood of being stored in the memory 110 can be generated by the processing unit 210, and data that has a higher likelihood of being stored in the memory 110 can be obtained from the memory 110 when the available period of time. Consequently, in the case where the time available for generating the data for the image frame runs out before all the data has been generated for the image frame, there is a higher likelihood that the data that has not yet been generated can be obtained from the memory 110 so that all the data for the image frame can thus be acquired within the required period of time.

Figure 6:
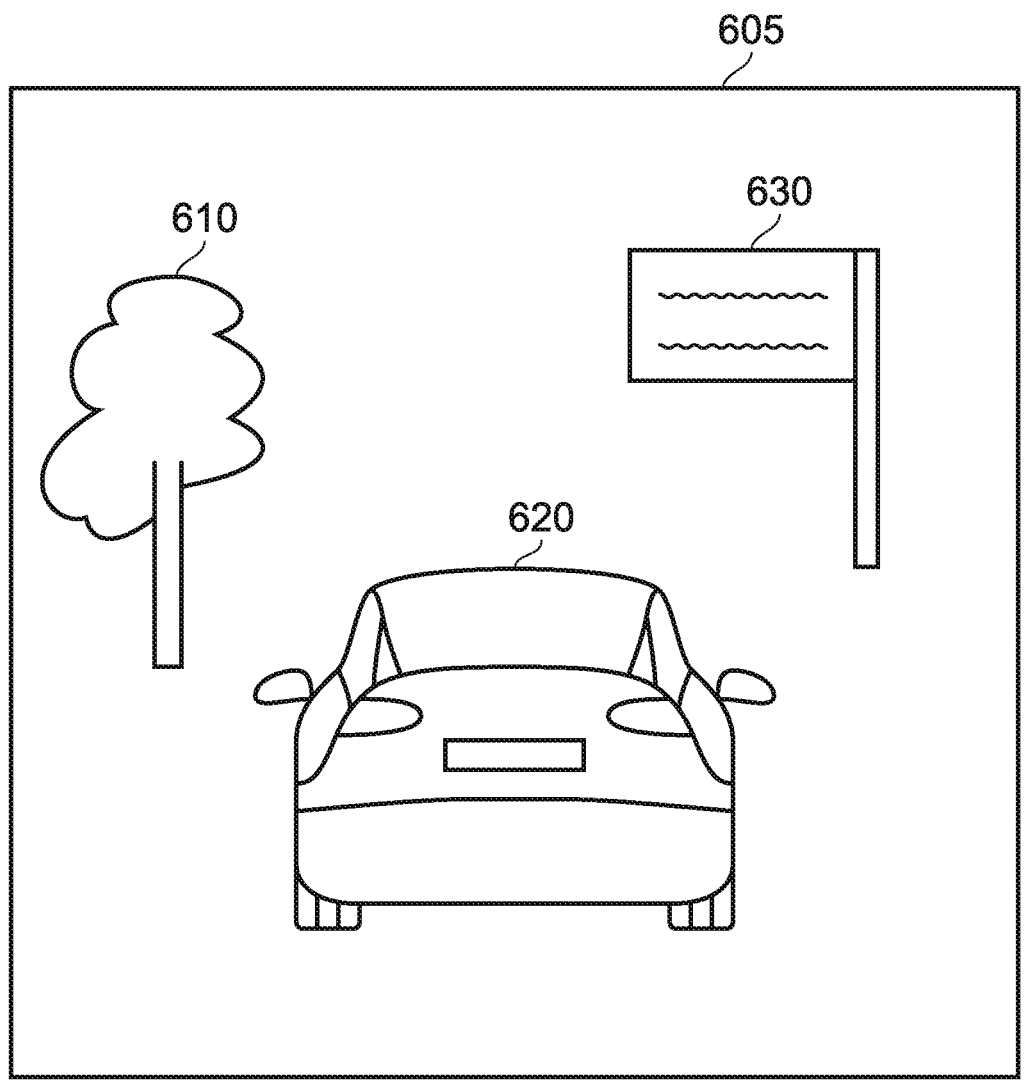
FIG. 6 is a schematic diagram illustrating generating data for objects in an image frame according to a priority order.

FIG. 6 illustrates an example image frame 605 including a first object 610, a second object 620 and a third object 630, in which first object data is stored in the memory 110 for the first object 610, second object data is stored in the memory 110 for the second object 620, and third object data is stored in the memory 110 for the third object 630. In this example, the indicator data associated with the first object data indicates a low likelihood that the object data will be used in more than a threshold number of image frames, the indicator data associated with the second object data indicates a high likelihood that the second object data will be used in more than a threshold number of image frames, and the indicator data associated with the third object data indicates a very low likelihood that the object data will be used in more than a threshold number of image frames. As such, the third object data is most likely to be evicted from the memory 110 and the second object data is least likely to be evicted from the memory 110 according to the data eviction policy.

The processing unit 210 is configured to generate the image data for the image frame 605 by initially (pre-emptively) executing graphics processing operations for generating each of the first, second and third object data and then terminating the graphics processing operations when the appropriate object data is accessed from the memory 110. The signal generated by the allocation circuitry 140 indicates the presence of the first, second and third object data in the memory 110 and the indicator data is used to indicate to the processing unit 210 that the third object data is most likely to be evicted from the memory 110 and the second object data is least likely to be evicted from the memory 110. In other words, the signal generated by the allocation circuitry 140 comprises information regarding both the presence of the object data and the indicator data associated with the object data, and the processing unit 210 is configured to generate the image data for the image frame 605 based on the properties of the signal. Since the third object data is most likely to be evicted from the memory 110 and the second object data is least likely to be evicted from the memory 110 during the time period required for generating the image data for the image frame 605, the processing unit 210 firstly generates the third object data, then generates the first object data and then generates the second object data. Consequently, the signal generated by the allocation circuitry 140 indicates to the processing unit 210 a priority order for generating the data for the respective objects 610, 620, 630 in the image frame 605.

As discussed previously, the processing unit 210 may be configured to generate the first object data, second object data and third object data according to the priority order and in the case where the time period available for generating the data for the image frame 605 expires before the second object data has been generated, the second object data is obtained from the memory 110. Therefore, by generating the first, second and third object data according to the priority order, there is a greater likelihood that data that is not generated within the available time (the data that is generated last according to the priority order) will be stored in the memory 100 and can thus be obtained from the memory 110 in order to acquire all the data for the image frame within the time period.

As there is a higher degree of confidence that the second object data will be stored in the memory 110, the time available for generating object data for the image frame 605 can be initially used for generating the first and third object data which are more likely to be evicted during the time period allowed for generating the image data for the image frame 605. In some examples, this allows time for the processing unit 210 to access and obtain the second object data from the memory 110 while the first and the third object data is generated. In this way, the graphics processing operations for processing the second object data can thus be terminated once the second object data is obtained by the processing unit 210, or in some cases the second object data is obtained before the graphics processing operations for processing the second object data are initiated.

In embodiments of the disclosure, the prediction circuitry 130 comprises a machine learning model trained to generate the confidences score indicative of the likelihood that the data for the given object is to be used for rendering more than the threshold number of image frames in a sequence of image frames. As discussed previously, the data that is generated by a graphics processing pipeline for a given object defines certain properties or characteristics for an object in an image frame including one or more from the list consisting of: a position of the object in the image frame; an orientation of the object in the image frame; a lighting of the object in the image frame; a depth of the object in the image frame; a position of a virtual camera defining a viewpoint for the image frame; an orientation of the virtual camera defining the viewpoint for the image frame; and a field of view of the virtual camera. These properties can be detected by the detection circuitry 120 and passed to the prediction circuitry 130 for generating the confidence score.

Figure 7:
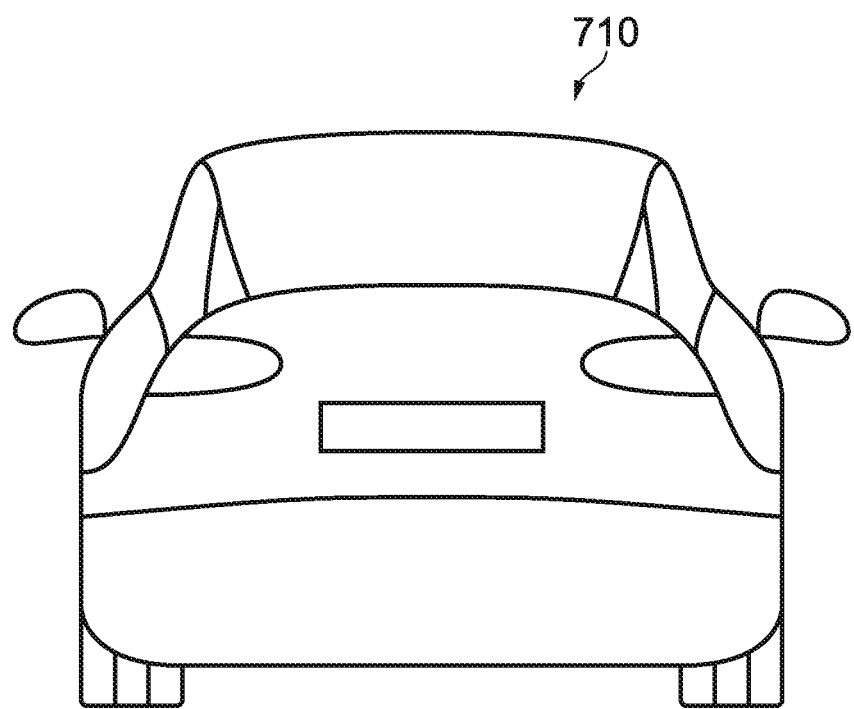
FIG. 7 is a schematic diagram illustrating an image frame including a car object.

The prediction circuitry 130 comprises a machine learning model that has been trained to correlate any of the one or more properties for an object in an image frame with a re-use likelihood for the data for the object. As such, any of the one or more properties for an object in an image frame can be correlated with a re-use likelihood for the object data. FIG. 7 shows an example of an image frame comprising an object 710. In the example shown, the object 710 is a car object having a position and orientation in the image frame such that the car object 710 is viewed from behind and the length of the car is aligned with the view direction for the image frame. Image data generated for the image frame is held in the memory 110, in which the data for the car object 710 defines one or more of the properties associated with the car object 710 in the image frame. One or more of the properties associated with the data for the car object 710 are detected by the detection circuitry 120 and provided as an input to the machine learning model. On the basis of the input, the machine learning model is trained to generate a confidence score as an output indicating a likelihood that the data for the car object 710 will be used in more than a threshold number of image frames.

The machine learning model is trained on sequences of image frames to learn when an appearance of an object is likely to be repeated again in a later image frame. In this case since the position and orientation of the car object 710 in the image frame is a common occurrence in a typical driving computer game, the machine learning model is trained to generate a confidence score indicating that there is a high likelihood that the data for the car object 710 in the image frame will be used again for another image frame in a sequence of image frames. The machine learning model is trained to receive input data from the detection circuitry 120, where the input data comprises a list of one or more properties associated with the data for the object 710, and to output the confidence score for the data for the object based on one or more of the properties. Consequently, in response to the confidence score generated by the machine learning model, indicator data can be allocated to the data for the car object 710 by the allocation circuitry 140.

In embodiments of the disclosure, the machine learning model is trained with image data comprising a sequence of image frames including a plurality of objects, and in which the machine learning model is trained to learn correlations between one or more properties associated with an object in a scene and a probability that the data for the object is to be used in more than a threshold number of images frames. For example, image data generated by an application such as a video game can be used as a data set for training the machine learning model. Using image data for displaying a plurality of image frames, the machine learning model can be trained to learn relationships between one or more properties associated with an object in an image frame and a likelihood of the data for the object being generated again for use in another image frame. Using image data for a sequence of images frames comprising a plurality of objects, the model can learn which graphical objects are likely to be used in multiple image frames and whether the same properties associated with a graphical object are likely to be used in multiple frames.

For the case where image data generated by an application such as a driving video game is used as training data, the sequence of image frames output by the application will comprise multiple image frames including the car object 710 viewed from various angles behind the car object 710 as the car negotiates the turns in the road. The machine learning model can be trained to identify instances of object data stored in the memory 110 and to learn which instances of object data have a high probability of reoccurrence during the game execution. In this case, data for rendering the car object 610 having the geometric and visual properties as shown in the image frame FIG. 7 will occur numerous times. As such, the multiple instances of the same data will be used for the car object 710 and this data for the car object 610 is thus identified as having a high probability of being used for multiple image frames.

Two instances of object data for a given object are considered to be the same when they both define the same properties for the object in an image frame. For example, when a first instance of object data for an object defines a position and an orientation, and a second instance of object data for the same object defines the same position and the same orientation, then the two instances of object data result in the same appearance for the given object and are considered to be the same. Therefore, the machine learning model generates, for the data for the given object in the image frame, a confidence score indicative of a likelihood that the data for the given object will be used in more than the threshold number of image frames.

In embodiments of the disclosure, the machine learning model is trained to generate, for the data for the given object, a second confidence score indicative of a likelihood that data that is substantially the same as the data for the given object is predicted to be used for more than the threshold number of image frames in a sequence of image frames, in which whether the data is substantially the same as the data for the given object is dependent upon whether a difference between one or more of the properties associated with the data for the given object in the image frame and one or more of the properties associated with the data is less than a threshold amount. The machine learning model can thus be trained output a first confidence score indicative of a likelihood that the same data is to be used for more than the threshold number of image frames and to output another confidence score indicative of a likelihood that data that is substantially the same as the data for the given object is to be used for more than the threshold number of image frames, in which whether the data is substantially the same as the data for the given object is dependent upon a degree of difference between one or more of the properties associated with the data for the given object in the image frame and one or more of the properties associated with the data. Detection results from the detection circuitry 120 for the data for an object in a current image frame, such as the car object 710, can be passed to the prediction circuitry 130 as an input to the machine learning model. Using the detection results, the machine learning model is trained to output both the first confidence score and the second confidence score. In order to generate the second confidence score, the machine learning model is trained to learn correlations between one or more properties associated with an object (e.g. the car object 710) in an image frame and a likelihood that data having one or more similar properties will be used in more than the threshold number of image frames. More generally, the machine learning model is trained to learn correlations between an appearance of an object in a current image frame and a likelihood that a visually similar appearance for the object will be used for a later image frame in a sequence of image frames. For example, referring again to the example image frame in FIG. 7, the memory 110 stores data for the car object 710, the detection circuitry 120 detects one or more properties for the car object 710 in the image frame, and data corresponding to the one or more detected properties is passed to the machine learning model as an input. The machine learning model is trained to predict a likelihood that any data for the car object 710 will be used for one or more later image frames and a likelihood that the data used for the car object 710 in one or more of the later image frames is the same as, or substantially the same as, the data for the car object 710 in the image frame in FIG. 7.

Whether or not data is substantially the same as the data for the car object 710 in the image frame is determined in dependence upon a comparison of the one or more properties for the car object 710 in the image frame and the one or more properties for the data that is predicted to be used for the car object 710 in one or more of the later image frames. Data that is considered to be substantially the same as the data for the car object 710 in the image frame in FIG. 7 is data that results in an image of a car object that has a visual appearance that is indistinguishable to the human eye from the image of the car object 710 shown in FIG. 7. For example, the data for the car object 710 in FIG. 7 has properties comprising one or more from the list consisting of: a position of the car object 610 in the image frame; an orientation of the car object 610 in the image frame; a lighting of the car object 610 in the image frame; a depth of the car object 610 in the image frame; a position of a virtual camera defining a viewpoint for the image frame; an orientation of the virtual camera defining the viewpoint for the image frame; and a field of view of the virtual camera. Another instance of data for the car object 710 that is predicted to be used in a later image frame also defines one or more properties for the car object 710 in the later image frame. Each of the one or more properties for the car object 710 in the later image frame can be compared with the one or more properties associated with the data for rendering the car object 710 in the image frame in FIG. 7 so as to determine a degree of difference between the two instances of data. A similarity criterion can be defined for each of the one or more properties, in which a property for the car object 710 in the later image frame can be compared with a corresponding property for the car object 710 in the image frame in FIG. 7, and when the difference is less than a threshold amount (e.g. X cm for the position in the scene) the similarity criterion is satisfied. When the similarity criterion is satisfied for each of the one or more properties the degree of difference between the two instances of data is such that the two instances of data are considered substantially the same.

Consequently, when the machine learning model predicts that data that is substantially the same as the data used for the car object 710 in the image frame is also to be used for a later image frame, the second confidence score is generated accordingly to indicate a high likelihood that data that is substantially the same will be used again in a later image frame. The allocation circuitry 140 is configured to allocate second indicator data to the data for the given object, the second indicator data indicative of a magnitude of the second confidence score and the data for the given object is stored in the memory 110 in association with the second indicator data. In this case, when the data for the later image frame is to be generated by the processing unit 210, rather than requiring the data to be generated, the data used previously to render the car object 710 (which is substantially similar in appearance to the car object to be rendered in the later image frame) is accessed from the memory 110 and used for the later image frame. Consequently, even though the data stored in the memory 110 may not be exactly the same as the data required for the later image frame, the data is suitable for displaying the object with a substantially similar appearance and processing efficiency is thus improved.

Therefore, the model can be trained using sequences of image frames to calculate a probability that the data for an object in a first image frame can be re-used to display the same object in a second image frame even when the data used for the object in the first image frame is not the exactly the same as the data used for the object in the second image. In other words, in addition to learning which types of data have a high probability of occurring by identifying multiple occurrences of the same data, the machine learning model may be trained to learn whether one instance of object data defining a first set of object properties can be used instead of another instance of object data defining a second set of object properties if the differences between the two instances of object data are non-significant so that the another instance of object data does not have to be generated by the processing unit 210.

In some examples, in a first image frame an object may have a first position and first orientation, whereas in a second image frame the same object may have a second position and second orientation. However, whereas the first position in the first image frame may differ significantly from the second position in the second image frame, the first orientation may be substantially the same as the second orientation. As such, a positional translation can be applied to the data for the object in the first image frame in order to produce the data for the object in the second image frame so that the object in the second image frame has substantially the same properties as the object in the first image frame. The machine learning model can thus be trained using the sequence of image frames to learn which data instances can be used for rendering objects in multiple image frames by applying a positional translation to the object position defined by a data instance. In this way, even though a positional property associated with a first instance of data may be different to a positional property associated with a second instance of data for the same object, provided that the orientation property is similar for the two data instances, the first instance of the data may be allocated to the cache memory 150 and when rendering a later image frame it is possible that the first instance of the data can be accessed from the cache memory 150 and a positional translation can be applied to produce the data for rendering the object at a different position in a scene.

Figure 8:
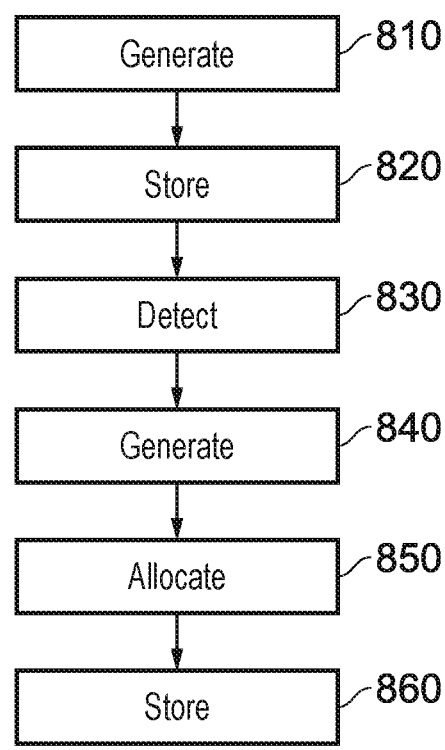
FIG. 8 is a schematic flowchart illustrating a data processing method.

Referring now to FIG. 8, in embodiments of the disclosure a data processing method comprises:

generating (at a step 810) image data for rendering data for display as an image frame;

storing (at a step 820), by a memory, the image data, the image data comprising data for a given object in the image frame;

detecting (at a step 830), for the data for the given object, one or more properties associated with the given object in the image frame;

generating (at a step 840), based on one or more of the properties, a confidence score for the data for the given object indicative of a likelihood that the data for the given object is to be used for more than a threshold number of image frames in a sequence of image frames; and allocating (at a step 850) indicator data to the data for the given object, the indicator data indicative of a magnitude of the confidence score for the data for the given object; and storing (at a step 860) the data for the given object in the memory in association with the corresponding indicator data.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The invention claimed is:

1. A data processing apparatus, comprising:
a processing unit to generate image data for rendering data for display as an image frame;
a memory to store the image data, the image data comprising data for a given object in the image frame;
detection circuitry to detect, for the data for the given object, one or more properties associated with the given object in the image frame;
prediction circuitry to generate, based on one or more of the properties, a confidence score for the data for the given object indicative of a likelihood that the data for the given object is to be used for more than a threshold number of image frames in a sequence of image frames; and
allocation circuitry to allocate indicator data to the data for the given object, the indicator data indicative of a magnitude of the confidence score for the data for the given object, and to store the data for the given object in the memory in association with the corresponding indicator data,
wherein the indicator data comprises a rating from a plurality of candidate ratings, and the allocation circuitry is configured to allocate one of the plurality of candidate ratings to the data for the given object in dependence upon a magnitude of the confidence score generated for the data for the given object.

2. The data processing apparatus according to claim 1, in which the prediction circuitry comprises a machine learning model trained to generate the confidence score.

3. The data processing apparatus according to claim 2, in which the machine learning model is trained with image data comprising a sequence of image frames including a plurality of objects, and in which the machine learning model is trained to learn correlations between one or more properties associated with an object in an image frame and a likelihood that the data for the object is to be used for more than the threshold number of images frames.

4. The data processing apparatus according to claim 1, in which the threshold number of image frames is one image frame.

5. The data processing apparatus according to claim 1, in which the threshold number of image frames is one image frame in a predetermined number of consecutive image frames in the sequence of image frames, in which the predetermined number is an integer number that is greater than or equal to two.

6. The data processing apparatus according to claim 2, in which the machine learning model is trained to generate, for the data for the given object, a second confidence score indicative of a likelihood that data that is substantially the same as the data for the given object is predicted to be used for more than the threshold number of image frames in a sequence of image frames, in which whether the data is substantially the same as the data for the given object is dependent upon whether a difference between one or more of the properties associated with the data for the given object in the image frame and one or more of the properties associated with the data is less than a threshold amount.

7. The data processing apparatus according to claim 1, in which the indicator data comprises a sub-rating from a plurality of candidate sub-ratings, and the allocation circuitry is configured to allocate one of the plurality of candidate sub-ratings to the data for the given object in dependence upon a processing time associated with generating for the data for the given object.

8. The data processing apparatus according to claim 1, in which the memory has a data eviction policy that is dependent upon the indicator data.

9. The data processing apparatus according to claim 1, in which the memory comprises a first memory portion and a second memory portion, the first memory portion is configured to store the image data generated by the processing unit, and the allocation circuitry is configured to store the data for the given object in the second memory portion in association with the corresponding indicator data.

10. The data processing apparatus according to claim 9, in which the first memory portion and the second memory portion each comprise a respective memory region and the second memory portion has a data eviction policy that is dependent upon the indicator data.

11. The data processing apparatus according to claim 10, in which the first memory portion is a buffer memory and the second memory portion is a cache memory, the cache memory having a larger memory size than the buffer memory.

12. The data processing apparatus according to claim 1, in which the processing unit is configured to generate the image data for the image frame in dependence upon a signal indicative of whether at least a portion of the image data to be generated is stored in the memory in association with the indicator data.

13. The data processing apparatus according to claim 12, in which the processing unit is configured to generate a portion of the image data for the image frame in response to a signal indicating that data for one or more objects to be generated by the processing unit is stored in the memory in association with the indicator data, and to obtain another portion of the image data for the image frame from the memory.

14. The data processing apparatus according to claim 12, in which the memory comprises a first memory portion and a second memory portion, the first memory portion is configured to store the image data generated by the processing unit, the allocation circuitry is configured to store the data for the given object in the second memory portion in association with the corresponding indicator data, and the processing unit is configured to initiate transfer of data for one or more objects from the second memory portion to the first memory portion in response to a signal indicating that data for one or more objects to be generated by the processing unit is stored in the second memory portion in association with the indicator data.

15. The data processing apparatus according to claim 12, in which the processing unit is configured to generate the image data for the image frame within a predetermined period of time and to generate the data for each object in the image frame according to a priority order that is dependent upon the indicator data associated with the data for the one or more objects stored in the memory.

16. The data processing apparatus according to claim 15, in which the processing unit is configured to firstly generate data for a first object having indicator data indicative of a first confidence score and then generate data for a second object having indicator data indicative of a second confidence score, in which the first confidence score has a lower confidence rating than the second confidence score.

17. The data processing apparatus according to claim 15, in which upon expiry of the predetermined period of time for generating the image data for the image frame, the processing unit is configured to obtain the image data that is not generated by the processing unit within the predetermined period of time from the memory.

18. The data processing apparatus according to claim 1, in which the one or more properties associated with the given object in the image frame comprises one or more of:
- a position of the object;
- an orientation of the object;
- a lighting of the object;
- a depth of the object;
- a position of a virtual camera for the scene;
- an orientation of the virtual camera; and
- a field of view of the virtual camera.

19. A data processing method, comprising:
- generating image data for rendering data for display as an image frame;
- storing, by a memory, the image data, the image data comprising data for a given object in the image frame;
- detecting, for the data for the given object, one or more properties associated with the given object in the image frame;
- generating, based on one or more of the properties, a confidence score for the data for the given object indicative of a likelihood that the data for the given object is to be used for more than a threshold number of image frames in a sequence of image frames;
- allocating indicator data to the data for the given object, the indicator data indicative of a magnitude of the confidence score for the data for the given object; and
- storing the data for the given object in the memory in association with the corresponding indicator data,
- wherein the indicator data comprises a rating from a plurality of candidate ratings, and the allocating includes allocating one of the plurality of candidate ratings to the data for the given object in dependence upon a magnitude of the confidence score generated for the data for the given object.

20. A non-transitory machine-readable storage medium which stores computer software which, when executed by a computer, causes the computer to perform a data processing method comprising:
- generating image data for rendering data for display as an image frame;
- storing, by a memory, the image data, the image data comprising data for a given object in the image frame;
- detecting, for the data for the given object, one or more properties associated with the given object in the image frame;
- generating, based on one or more of the properties, a confidence score for the data for the given object indicative of a likelihood that the data for the given object is to be used for more than a threshold number of image frames in a sequence of image frames;
- allocating indicator data to the data for the given object, the indicator data indicative of a magnitude of the confidence score for the data for the given object; and
- storing the data for the given object in the memory in association with the corresponding indicator data,
- wherein the indicator data comprises a rating from a plurality of candidate ratings, and the allocating includes allocating one of the plurality of candidate ratings to the data for the given object in dependence upon a magnitude of the confidence score generated for the data for the given object.

* * * * *